United States Patent [19]

Streit et al.

[11] 4,360,046
[45] Nov. 23, 1982

[54] SANITARY WASTE GREASE DISPOSAL APPARATUS

[76] Inventors: Philip N. Streit, 3505 Lockheed, Midland, Tex. 79703; Lyle E. Leininger, Rte. 8, Box 537, Lakeside, Tex. 76108

[21] Appl. No.: 157,552

[22] Filed: Jun. 9, 1980

[51] Int. Cl.³ .............................................. B65B 3/04
[52] U.S. Cl. ...................... 141/82; 141/98; 141/231; 220/263; 219/316; 219/421; 312/229
[58] Field of Search ............... 219/316, 320, 421, 425, 219/483, 494; 220/1 C, 4 R, 263; 312/229; 191/12 R; 426/1; 141/1, 8, 11, 82, 98, 231–233, 69–81, 85–96

[56] References Cited

U.S. PATENT DOCUMENTS

| | | | |
|---|---|---|---|
| 1,554,589 | 9/1925 | Long | 220/1 C X |
| 1,831,687 | 11/1931 | Ross | 220/4 R X |
| 2,193,893 | 3/1940 | Van Vleck | 191/12 R |
| 2,813,961 | 11/1957 | Purdue | 219/484 |
| 3,004,130 | 10/1961 | Miller | 219/320 |
| 3,280,301 | 10/1966 | Anderson et al. | 219/320 |

*Primary Examiner*—Houston S. Bell, Jr.
*Attorney, Agent, or Firm*—Neal J. Mosely

[57] ABSTRACT

A sanitary waste grease and fat disposal system and apparatus includes a novel sanitary storage unit for storage and handling of waste fatty materials, a tank truck for transportation of such materials, and equipment for transferring the stored materials to the truck for transportation to a fatty material processing plant. The sanitary storage unit is an enclosed storage bin of sealed, sanitary construction with a top opening for introduction of fatty materials and a bottom, valved outlet for connection to a hose for pumping to a tank truck for transportation. The top of the storage unit has a spring loaded lid which opens by operation of a pedal and has an interior wall with a strainer for trapping larger contaminating materials from the fatty materials being collected. The contents is kept fluid by a thermostatically controlled heating element in the bottom of the storage unit. The fatty contents is kept fluid in the tank truck by means of a heat exchange conduit conducting the hot exhaust gases from the truck motor through the tank.

21 Claims, 9 Drawing Figures

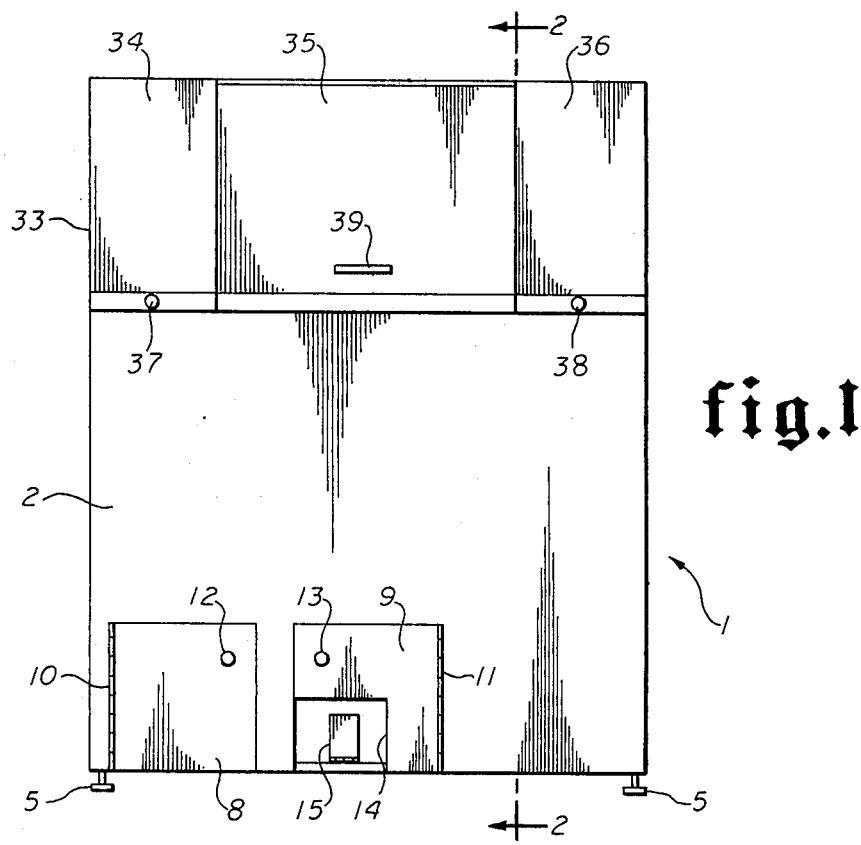
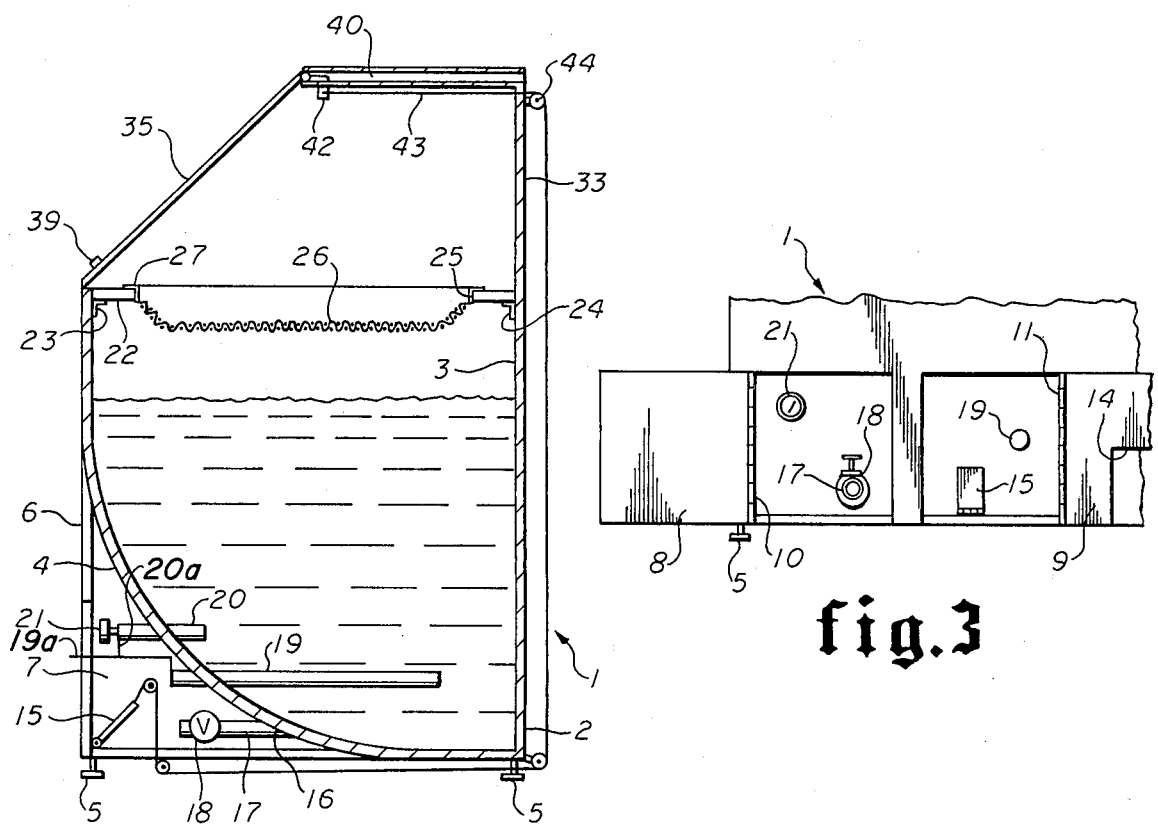
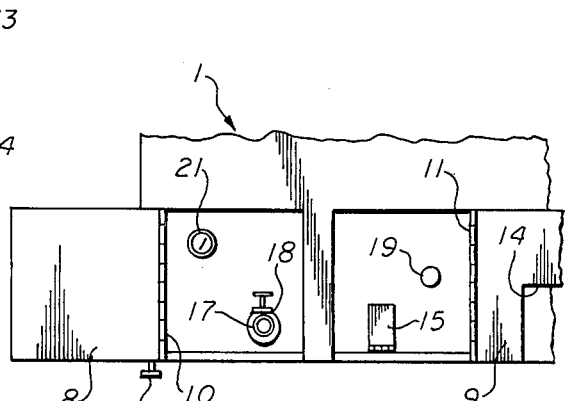

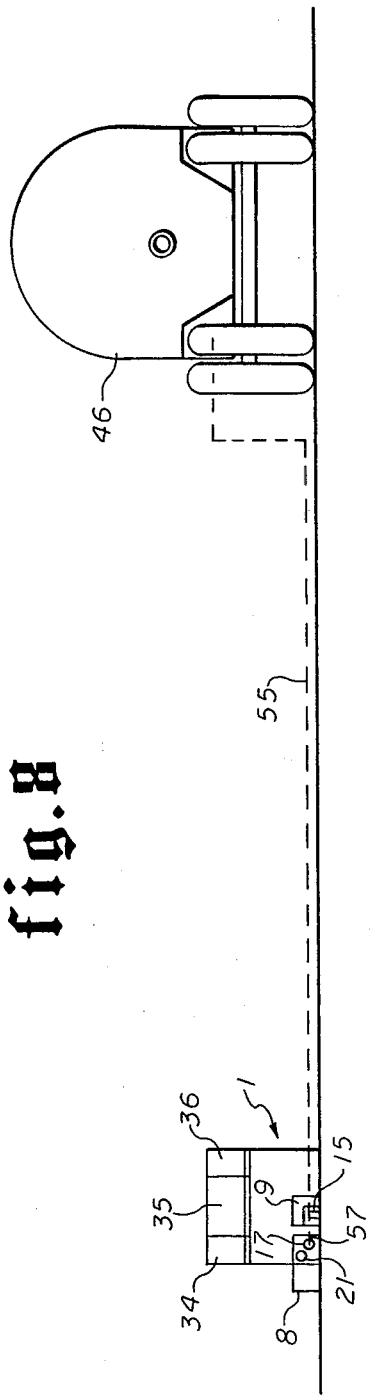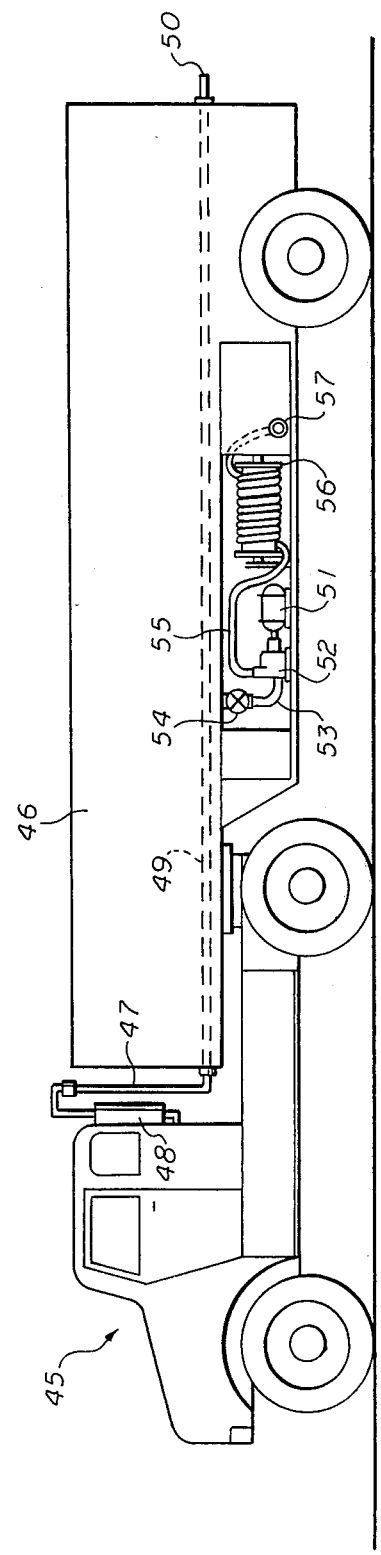

SANITARY WASTE GREASE DISPOSAL APPARATUS

BACKGROUND OF THE INVENTION

1. Field of the Invention

This invention relates to new and useful improvements in storage units and storage and transportation systems for handling waste fatty materials, such as fats, greases and oils, from restaurants and other food handling facilities.

2. Brief Description of the Prior Art

It is well known in the prior art to collect waste fats, oils and greases from restaurants and other food handling facilities in drums or barrels. Such drums or barrels are picked up by trucks periodically and carried to rendering or other processing plants for reclaiming the fatty materials. This method and apparatus for collection of waste fatty materials is not sanitary in that the barrels and drums attract pests of various types creating a public health problem. The present practice is also unsafe in that the process of emptying hot grease, fats and oils has created spilling and slopping hazards for those that handle the materials.

Prior art patents which are somewhat relevant to certain features of this invention are discussed briefly below.

Ross U.S. Pat. No. 1,831,687 discloses a sheet metal garbage or trash container having a pedal operated door.

Purdue U.S. Pat. No. 2,813,961 discloses an apparatus for storage of viscous materials which has a thermostatically controlled electric immersion heater.

Long U.S. Pat. No. 1,554,589 discloses a portable oil drain pan having a depression in one portion and a strainer for recovery of contaminates.

Van Vleck U.S. Pat. No. 2,193,893 discloses a tank truck with a pump and hose for handling the filling and unfilling of the tank.

Miller U.S. Pat. No. 3,004,130 discloses an electrically heated tank truck.

Anderson U.S. Pat. No. 3,280,301 discloses an electrically heated tank truck for carrying fluid materials.

SUMMARY OF THE INVENTION

One of the objects of this invention is to provide a new and improved system for the storage and collection of fatty materials derived from edible fats for transportation to a place of reprocessing.

Another object of the invention is to provide an improved waste fat handling system which is sanitary and makes easy the storage and transportation of waste fatty materials.

Still another object of the invention is to provide an improved waste fat handling system including a storage unit or bin having easy access for introduction of waste fatty materials and means for draining fatty materials for transportation by a heated tank truck.

Another object of the invention is to provide an improved system for handling waste fatty materials including a storage unit or bin having a thermostatically controlled electric heater for keeping the contents fluid, a bactericidal lamp for sanitation, and a dip stick for evaluating the contents.

Another object of the invention is to provide an improved system for handling waste fatty materials which is simple and inexpensive to manufacture and assemble and inexpensive to operate, and provides for improved sanitary conditions in the storage and handling of waste fats, greases and oils in restaurants and other food handling establishments.

Other objects of this invention will become apparent throughout the specification and claims as hereinafter related.

A sanitary system for collection, storage and transportation of waste fatty materials which accomplishes the foregoing objects is described more fully hereinafter. The system includes a sanitary storage unit or bin of seals fluid tight construction having a top opening for introduction of fatty materials being collected and a bottom outlet for removal of the contents to a tank truck for transportation to a rendering plant or other processing facility. The tank truck is preferably heated by circulating the hot exhaust gases from the motor of the truck through a heat exchanger in the tank of the truck to keep the contents fluid. The storage unit has a spring loaded, self opening lid for ease of filling. The bottom outlet is a valve opening for connection to a hose from the tank truck for pumping the contents to the tank. The storage unit is electrically heated by a thermostatically controlled electric heater. The top of the tank has a top shelf with a strainer in the opening into the storage container for catching objects which may have fallen into the grease or fats and has a dip stick for evaluating the contents of the unit.

BRIEF DESCRIPTION OF THE DRAWINGS

FIG. 1 is a view in elevation of a sanitary storage unit or bin for use in a sanitary waste fatty material storage, transportation and pickup system.

FIG. 2 is a sectional view taken on the line 2—2 of FIG. 1 which shows the interior of the storage bin.

FIG. 3 is a detailed view in front elevation of the lower part of the storage bin shown in FIG. 1 with the doors opened.

FIG. 8 is a schematic view showing the pickup of waste materials from the storage unit into a tank truck.

FIG. 9 is a view in side elevation of a tank truck having a novel heat exchanger for keeping the contents fluid and having a pump for filling and emptying the tank with the fluid fatty materials being stored and handled.

DESCRIPTION OF THE PREFERRED EMBODIMENTS

In the accompanying drawings, there is shown a novel storage and transportation system for handling waste fatty materials in a sanitary manner. As noted above, waste fatty materials, such as greases, fats and oils, from restaurants and other food handling facilities are stored in drums or barrels, usually at the rear door or outside the establishment until picked up for transportation to a processing or rendering plant. This practice is not sanitary in that the drums and barrels tend to attract pests, such as rodents, small animals, insects, etc. and is responsible for a substantial public health problem. The present practice of handling waste fatty materials is also unsafe in that the process of emptying hot fats or greases or oils into drums or barrels is inherently hazardous.

In the accompanying drawings, there is shown a preferred embodiment of an improved system for storage and transporation of waste fatty materials for rendering or processing. This system comprises an improved storage unit or bin for handling fluid fatty materials and a tank truck for transporting the fatty materials for rendering or processing. The storage unit or bin is of novel construction and includes a variety of features which contribute to the sanitary handling of waste fatty materials.

Figure 4:
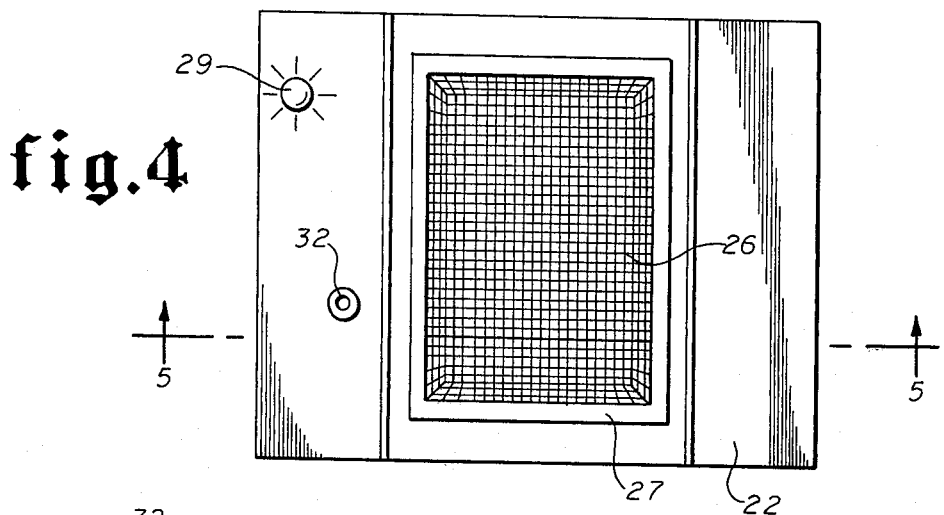
FIG. 4 is a plan view of the storage bin shown in FIG. 1 with the top cover portion removed.
Figure 5:
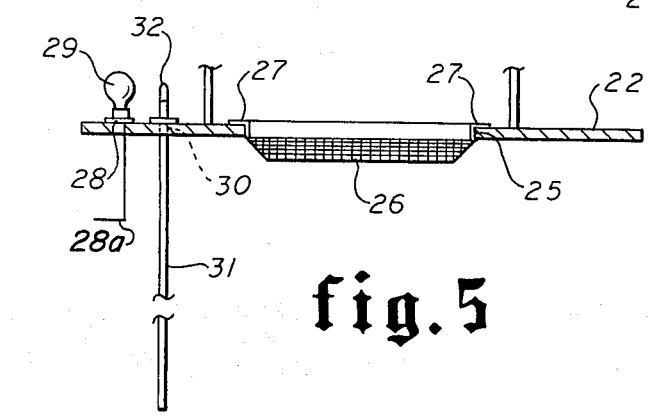
FIG. 5 is a sectional view taken on the line 5—5 of FIG. 4 showing the relationship of the top shelf, strainer, germicidal lamp and dip stick.
Figure 6:
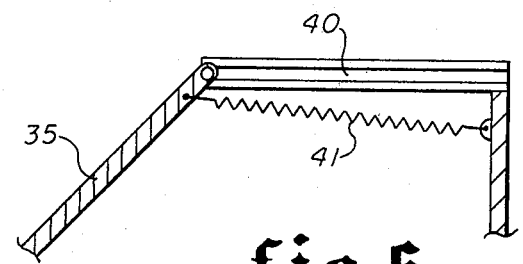
FIG. 6 is a detail view, in section, showing the operation of the self opening lid for the storage unit.
Figure 7:
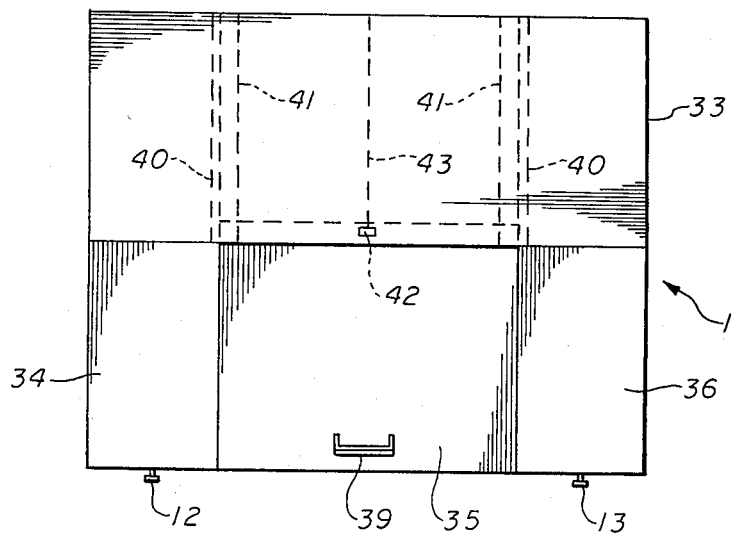
FIG. 7 is a top plan view of the upper cover portion of the storage unit shown in FIG. 1.

Referring to the drawings by numerals of reference, and more particularly to FIGS. 1 to 7, there is shown a novel storage unit or bin 1 which is designed especially for use in a novel sanitary handling system for waste fatty materials. The storage unit or bin 1 may be of any suitable sanitary material of construction and would ordinarily be of stainless steel for handling waste fatty materials from restaurants, although other suitable materials of construction, such as aluminum, fiberglass or the like could be used.

Storage unit 1 comprises an outer box shaped enclosure 2 surrounding an inner bin 3 having a curved bottom wall 4 which is curved from back to front. Inner bin 3 is of fluid tight, sanitary construction for containing fluid waste fatty materials from restaurants and other food handling establishments. The bottom wall 4 is curved so that the unit may be tipped forward for emptying, as will be subsequently described. Storage unit or bin 1 is supported on casters or leveling legs 5 as shown in FIGS. 1 and 2.

Front wall 6 of box shaped enclosure 2 and curved wall 4 of bin 3 define a lower compartment 7 at the front of the storage unit. A pair of doors 8 and 9, supported on hinges 10 and 11 and having handles 12 and 13, open into the front lower compartment 7. Door 9 has a rectangular opening 14 therein for access to a lid-operating pedal 15 which will be described more fully hereinafter.

Front lower compartment 7 provides space for access to certain auxiliary equipment. In compartment 7, there is provided a lower outlet opening 16 from storage bin 3 which comprises outlet pipe or conduit 17 and manually operated valve 18. Valve 18 is preferably a manually operated one inch ball valve. Conduit 17 and valve 18 provide access to storage bin 3 for pumping out the contents to a tank truck for transportation to a processing or rendering plant as hereinafter described. The curved bottom wall 4 of storage bin 3 has a curvature such that the unit may be tipped to insure that all of the contents may be withdrawn through bottom outlet opening 16.

The apparatus is provided with an immersion electric heater 19 having an electric lead 19a (shown schematically) for connection to a a power source which extends through curved wall 4, as seen in FIGS. 2 and 3. The apparatus is also provided with a thermostat 20 which is adjustable at indicator 21. Thermostat 20 can be set to maintain any desired temperature for the contents of storage bin 3 by regulating the temperature of immersion heater 19 by connection 20a to 19a.

The top portion of storage bin 3 is closed by shelf 22 which is removably supported on flanges 23 and 24. Shelf 22 is provided with a central opening 25 in which there is positioned a strainer 26 which is preferably of a dished construction and having a peripheral flange 27 supporting the same on shelf 22. Strainer 26 is preferably of #10 stainless steel, removable for cleaning, for catching items present in the fatty material being poured into the storage unit. Shelf 22 also supports the base 28 for a bactericidal lamp 29 (having an electric lead 28a for connection to a power source) which is effective to mitigate the growth of bacteria in the storage unit. Shelf 22 is provided with an aperture 30 in which there is supported a dip stick 31 having a handle 32 for ease of removal. Dip stick 31 is useful in determining the depth of fatty materials collected in the storage unit and also may evaluate the composition of the contents of the storage unit and particularly determine whether there is a substantial contamination with water.

The upper portion of box shaped enclosure 2 comprises a cover portion 33 having three aligned panels 34, 35 and 36 in front which provide access to the interior of the unit. The end panels 34 and 36 are provided with locks 37 and 38 to prevent unauthorized opening. Central panel 35 has a handle 39 and is supported in a track 40 and urged by spring 41 toward an open position. When in a closed position, lid or panel 35 is secured by latch 42 against movement by spring 41. Latch 42 is spring loaded toward a latched position and is connected by wire or cable 43 extending over a series of pulleys 44 and connected to pedal 15, as seen in FIG. 2. The operation of pedal 15 is effective to release latch 42 to allow springs 41 to move lid or panel 35 to an open position for introduction of waste fatty materials into storage bin 3.

In FIGS. 8 and 9, there is shown a view in side elevation of tank truck for picking up fatty materials from the storage units and a schematic view showing the connection from the tank truck to the storage unit for transferring fatty materials to the tank.

In FIG. 9, there is shown a tank truck 45 having a tank portion 46 with a conduit 47 extending from the exhaust 48 from the truck motor to a heat exchanger 49 which extends through the entire length of the tank 46 and exhausts at 50. The exhaust gases from the truck motor are used to provide heat to keep the contents of tank 46 fluid. The tank 46 on tank truck 45 is provided with a motor 51 which drives a pump 52 for filling and emptying tank 46. Pump 52 is a reversible pump which can be used either for filling or emptying tank 46 and is connected through conduit 53 and valve 54 to the bottom of the tank. The other side of pump 52 is connected to hose 55 which is supported on reel 56 and has an end portion 57 which is extensible away from reel 56 for pumping fluid waste fatty materials to or from the tank 46. In FIG. 8, hose or conduit 55 is shown in an extended position from tank 46 with end portion 57 connected to outlet 17 from ball valve 18 at the bottom of storage unit 1. Valve 18 is opened and pump 52 on tank truck 45 is effective to pump the contents from storage unit 1 into tank 46. Tank truck 45 is used to collect waste fatty materials from a plurality of storage units located at different restaurants or food handling facilities and when a sufficient amount has been collected is used to carry the contents on to the fat processing or rendering facility.

OPERATION

The operation of this sanitary waste fatty materials storage and pickup system should be more or less obvious from the foregoing description of the system and its component parts. Nevertheless, a brief recapitulation of the operation of the system and its components will be given to insure complete understanding of the invention.

Storage unit 1 is designed for storage of waste fatty materials from restaurants and other food handling and food processing facilities. It is particularly designed for the storage of fluid oils and greases and fats which are in a more or less fluid condition. The unit described is for storage of waste materials inside a restaurant in a storage area and is sufficiently sanitary to comply with health and safety regulations. This storage unit makes storage and disposal of waste fatty materials a sanitary process. The storage unit 1 may be of a size accommodating approximately 600 gallons of waste fatty materials. The storage unit may be larger or smaller according to the needs of the particular establishment. The storage unit is preferably constructed of stainless steel for restaurant use or may be of other sanitary materials, such as aluminum, fiberglass or plastic.

In the storage unit, the center lid panel 35 is held in a normally latched position by latch 42. It is automatically opened by depressing pedal 15 which releases latch 42 and allows springs 41 to open lid panel 35 to the inside of the apparatus. The opening of lid panel 35 exposes the inner storage bin for introduction of the waste greases, fats and oils therein. Since the door or lid panel 35 is opened automatically by use of pedal 15 the operators hands are free to hold and handle the container of hot grease or fats or oils while pouring it into the storage unit.

The waste fatty materials is introduced into the storage unit through strainer 26, which is preferably a #10 stainless steel strainer, which is designed to catch items which might have been dropped into the hot grease, fats or oils or other contaminating materials. The two side panels 34 and 36 are locked as indicated at 37 and 38 which prevents removal of shelf 22 by unauthorized personnel. Inside the top opening to storage unit 1, there is provided a bactericidal lamp 29 which mitigates bacterial growth inside the unit. Also located on shelf 22 inside one of the locked lid panels is a round opening or aperture in which a sample probe may be supported or inserted to determine the contents of the unit prior to drainage. The sample probe is used by the waste grease collection facility to examine and measure the tank contents to determine the quantity present also the presence of water or other contaminating materials.

At the bottom of the front panel of storage unit 1 the doors 8 and 9 are locked to prevent tampering with the apparatus. Inside door 8, is the thermostat which controls the temperature of heating element 19 which is preferably a 200 watt immersion electric resistance heater. This heater is located at the bottom of the tank in the center that extends into the tank to keep the greases, fats and oils liquid for pumping. As previously noted the curved bottom wall 4 of the storage unit or tank is effective to insure proper drainage when emptying the contents. This sloping wall also allows space for compartment 7 in which the foot pedal 15, ball valve 18, heating element 19 and thermostat 20 are located.

This waste grease storage unit 1 is sanitary and safe for the operators use. It is designed to be located inside restaurants and other food handling or food processing facilities near the sources of the fats or oils or greases. This makes it convenient for the waste fatty materials to be emptied on the premises rather than having to be carried outside. Of course, if desired, the storage units may be located in a separate storage room or outside the restaurant, whichever is most convenient. The construction of the unit is tightly sealed which prevents access by rodents and small animals and, when closed, it is substantially inaccessible to flies and other insects. Certain variations in design are considered to be within the general conception of this invention. For example, the use of a pedal operated door or lid which is not spring operated is an acceptable option. Also, where a spring operated door or lid is used, it can be operated by a latch in front and the pedal operator eliminated. An additional optional feature of some advantage, which can be included, is a small pump and hose reel positioned inside the top of the bin just inside and to the back of the door or lid which can be used for pumping greases or fats from deep frying wells or the like directly into the storage bin.

The waste fats and greases are picked up by a large tank truck 45 having a storage tank 46. The tank truck may be a single axle or a tandem truck or semi similar to gasoline or other liquid transport trucks. As described above, hose 55 and connection 57 are provided and may be extended from the truck to be fastened to ball valve 18 so that the fluid contents of storage unit 1 may be transferred by means of pump 52 into storage tank 46 on tank truck 45. The contents of tank 46 are kept warm by the hot exhaust gases from the truck motor flowing through heater exchanger 49. If the heat from the exhaust gases of the truck motor is insufficient, it may be supplemented by electric heaters or the like. When the tank truck 45 reaches rendering plant or other fatty material processing facility the pump 52 is used to pump out the fluid contents of tank 46. This system is a highly sanitary and safe way to pickup waste fatty materials, such as greases, oils and fats, without the use of open barrels or other unsanitary procedures used at present.

While this invention has been described fully and completely with special emphasis upon a single preferred embodiment, it should be understood that within the scope of the appended claims the invention may be practiced otherwise than as specifically described herein.

We claim:

1. A sanitary system for collection, storage and transportation of waste fatty material for reprocessing which comprises a sanitary storage unit for collection and storage of waste fatty materials of edible fatty origin, said storage unit including an enclosed bin of sealed fluid tight construction having a top opening for introduction of fatty materials being collected and a bottom outlet opening for removal of the contents to a tank truck for transportation, a self opening lid for said top opening, means for straining contaminating materials from the fatty materials being collected, means for mitigating the growth of bacteria in said storage unit, means for supplying controlled heat to said storage unit to keep the contents fluid, a tank truck for transportation of the fluid fatty materials collected in said storage unit, means including a pump and hose for connection to the outlet from said storage unit for pumping the contents thereof to said tank truck, and electric heating means in the tank of said tank truck for maintaining the contents fluid during transportation to a facility for reprocessing.

2. A sanitary system according to claim 1 in which said storage unit lid is spring loaded toward open position and said unit includes pedal operated means for releasing said lid to permit the same to open.

3. A sanitary system according to claim 1 in which said means for mitigating bacterial growth is a bactericidal lamp.

4. A sanitary system according to claim 1 in which said storage unit heat supplying means comprises an electric resistance heater and said unit includes an adjustable thermostat controlling the temperature of said heater.

5. A sanitary system according to claim 1 in which said storage unit includes a manually operated valve in said bottom outlet opening.

6. A sanitary system according to claim 1 in which said storage unit comprises an outer box shaped enclosure and an inner bin having a bottom wall curved upward toward the front to permit said unit to be tipped forward for emptying the contents, and said bottom outlet opening being in said curved bottom wall.

7. A sanitary system according to claim 6 in which said storage unit has a top wall secured thereon having three linearly aligned panels opening therein, and means securing the end panels against unauthorized opening, and the central panel comprising said self opening lid.

8. A sanitary system according to claim 6 in which the front wall of said box shaped enclosure and said curved bottom wall of said bin define a compartment at the bottom front part of said enclosure, said lid being spring loaded toward open position and said unit including a pedal positioned in said bottom compartment and operatively connected for releasing said lid for opening, said bottom outlet being in said curved bottom wall and opening into said bottom compartment and including an outlet control valve, said heat supplying means comprising an electric resistance heater and including an adjustable thermostat for controlling the heat thereof, and extending from said bottom compartment into said bin through said curved bottom wall, and said box shaped enclosure having at least one door opening into said bottom compartment for access thereto.

9. A sanitary system according to claim 1 in which said storage unit includes a tray extending across the entire top thereof and accessable through said self opening lid, and said tray including a strainer in the central portion thereof aligned with said top opening.

10. A sanitary system according to claim 9 in which said storage unit tray includes an aperture and a dip stick supported therein for testing the contents of said unit.

11. A sanitary system according to claim 1 in which said tank heating means comprises heat exchange means in said tank for conducting the exhaust gases from the motor of said truck therethrough.

12. A sanitary storage unit for collection and storage of waste fatty materials of edible fatty origin for storage, colection and transportation for reprocessing, said storage unit including an enclosed bin of sealed, fluid tight construction having a top opening for introduction of fatty materials being collected and a bottom outlet opening for removal of the contents to a tank truck for transportation, a self opening lid for said top opening, means for straining contaminating materials from the fatty materials being collected, means for mitigating the growth of bacteria in said storage unit, and electric means for supplying controlled heat to said storage unit to keep the contents fluid.

13. A sanitary storage unit according to claim 12 in which said self opening lid is spring loaded toward open position and said unit includes pedal operated means for releasing said lid to permit the same to open.

14. A sanitary storage unit according to claim 12 in which said means for mitigating bacterial growth is a bactericidal lamp.

15. A sanitary storage unit according to claim 12 in which said heat supplying means comprises an electric resistance heater and said unit includes an adjustable thermostat controlling the temperature of said heater.

16. A sanitary storage unit according to claim 12 which includes a manually operated valve in said bottom outlet opening.

17. A sanitary storage unit according to claim 12 comprising an outer box shaped enclosure and an inner bin having a bottom wall curved upward toward the front to permit said unit to be tipped forward for emptying the contents, and said bottom outlet opening being in said curved bottom wall.

18. A sanitary storage unit according to claim 17 in which said box shaped enclosure has a top wall secured thereon having three linearly aligned panels opening therein, and means securing the end panels against unauthorized opening, and the central panel comprising said self opening lid.

19. A sanitary storage unit according to claim 17 in which the front wall of said box shaped enclosure and said curved bottom wall of said bin define a compartment at the bottom front part of said enclosure, said lid being spring loaded toward open position and said unit including a pedal positioned in said bottom compartment and operatively connected for releasing said lid for opening, said bottom outlet being in said curved bottom wall and opening into said bottom compartment and including an outlet control valve, said heat supplying means comprising an electric resistance heater and including an adjustable thermostat for controlling the heat thereof, and extending from said bottom compartment into said bin through said curved bottom wall, and said box shaped enclosure having at least one door opening into said bottom compartment for access thereto.

20. A sanitary storage unit according to claim 12 in which said storage unit bin has a tray extending across the entire top thereof and accessable through said self opening lid, and
said tray including a strainer in the central portion thereof aligned with said top opening.

21. A sanitary storage unit according to claim 20 in which
said tray includes an aperture and a dip stick supported therein for testing the contents of said storage unit.

* * * * *